(12) United States Patent
Latham (10) Patent No.: US 11,329,457 B1
(45) Date of Patent: May 10, 2022

(54) PANELBOARD AND ELECTRICAL POWER DISTRIBUTION SYSTEM

(71) Applicant: Dean Latham, Tullahoma, TN (US)

(72) Inventor: Dean Latham, Tullahoma, TN (US)

( * ) Notice: Subject to any disclaimer, the term of this patent is extended or adjusted under 35 U.S.C. 154(b) by 0 days.

(21) Appl. No.: 16/897,198

(22) Filed: Jun. 9, 2020

Related U.S. Application Data

(60) Provisional application No. 62/860,326, filed on Jun. 12, 2019.

(51) Int. Cl.
*H02B 1/14* (2006.01)
*H02B 1/056* (2006.01)
*H02B 1/32* (2006.01)
*H02B 1/20* (2006.01)

(52) U.S. Cl.
CPC ............. *H02B 1/14* (2013.01); *H02B 1/056* (2013.01); *H02B 1/205* (2013.01); *H02B 1/32* (2013.01)

(58) Field of Classification Search
CPC .......... H02B 1/056; H02B 1/14; H02B 1/205; H02B 1/32; H02B 11/24
See application file for complete search history.

(56) References Cited

U.S. PATENT DOCUMENTS

| | | | |
|---|---|---|---|
| 2,340,082 A * | 1/1944 | Sauers | H02B 11/24 361/607 |
| 2,871,284 A | 1/1959 | Wills | |
| 3,141,997 A | 7/1964 | Jacobs | |
| 3,155,445 A | 11/1964 | Johnson | |
| 4,183,073 A * | 1/1980 | Clausing | H02B 11/24 200/304 |
| 5,046,173 A | 9/1991 | Wall, Jr. | |
| 5,272,592 A | 12/1993 | Harris et al. | |
| 5,327,321 A * | 7/1994 | Rosen | H02B 1/14 200/50.22 |
| 6,002,580 A | 12/1999 | LeVantine et al. | |
| 6,999,854 B2 | 2/2006 | Roth | |
| 7,064,641 B2 * | 6/2006 | Rowe | H02B 11/24 200/50.22 |
| 7,889,480 B2 | 2/2011 | Latham | |
| 8,649,160 B2 | 2/2014 | Mills et al. | |
| 9,197,039 B2 | 11/2015 | Latham | |
| 9,293,897 B2 | 3/2016 | Latham | |

(Continued)

FOREIGN PATENT DOCUMENTS

| | | | |
|---|---|---|---|
| KR | 101269701 B1 * | 5/2013 | |
| KR | 20150096878 A * | 8/2015 | |
| KR | 20150101385 A * | 9/2015 | |

*Primary Examiner* — Robert J Hoffberg
(74) *Attorney, Agent, or Firm* — Wayne Edward Ramage; Baker Donelson (57) ABSTRACT

An electrical power distribution system that includes a hollow body with at least one seamless insulated bus bar on top of a non-energized metal mounting surface. A plurality of connection points are distributed along the bus bar for electrical device connections. The connection points are contained inside molded plastic louvers and are electrically connected to the main bus bar. Electrical device connections are accomplished via plugging directly onto the electrical connection points while the plastic louvers recede from around the bus bar. The attachment of electrical devices of various sizes and configurations may be accommodated though varying the pitch and size of the electrical connection points.

9 Claims, 6 Drawing Sheets

(56) References Cited

U.S. PATENT DOCUMENTS

| | | | |
|---|---|---|---|
| 9,437,385 B1* | 9/2016 | Mittelstadt | H01H 71/0264 |
| 9,450,384 B2* | 9/2016 | Sharp | H01R 13/4538 |
| 9,564,741 B1* | 2/2017 | Mittelstadt | H01H 71/08 |
| 9,595,816 B2* | 3/2017 | Walgenbach | H02B 1/04 |
| 9,711,954 B2* | 7/2017 | Pope | H02B 1/14 |

* cited by examiner

PANELBOARD AND ELECTRICAL POWER DISTRIBUTION SYSTEM

This application claims benefit of and priority to U.S. Provisional App. No. 62/860,326, filed Jun. 12, 2019 by Dean Latham. The complete disclosure, specification, and drawings of U.S. Provisional App. No. 62/860,326 are incorporated herein by specific reference in their entireties for all purposes.

FIELD OF INVENTION

This invention relates to an electrical power distribution system. More specifically, this invention relates to low voltage panelboards and power distribution systems with ease of manufacture through the use of an error-proof manufacturing design, as well as improved safety and universal component compatibility though the use of retractable molded louver insulators.

BACKGROUND OF THE INVENTION

Panelboards (also known as loadcenters) and power distribution systems are currently used in many industrial and commercial applications as a means of distributing electrical power from an electrical source to a multitude of downstream loads (e.g., lighting, outlets, electrical equipment, and the like). These panelboards and power distribution systems provide a plurality of connection points for electrical components (e.g., circuit breakers) to electrically couple with an electrical source. Typically, that source is a two or three phase power supply. As is known in the art, the electrical components are designed to monitor and open the circuit to downstream loads when a predetermined load is exceeded.

Though the prior art panelboards and power distribution systems are effective in distributing power, many limitations exist. Due to their design, the prior art systems have "live" electrical connection points that are exposed. These live components pose a risk of shock during installation and maintenance. This is particularly the case when an electrical component is applied to a system, as these components are applied directly by personnel "screwing" or "plugging" in conductor parts, which may or may not be "live." Examples of prior art panelboards with live parts are disclosed in Wills, U.S. Pat. No. 2,871,284; Jacobs, U.S. Pat. No. 3,141,997; Johnson, U.S. Pat. No. 3,155,445; Wall, U.S. Pat. No. 5,046,173; Harris, U.S. Pat. No. 5,272,592; LaVantine et al., U.S. Pat. No. 6,002,580; Roth, U.S. Pat. No. 6,999,854; Latham, U.S. Pat. No. 7,889,480; Mills, U.S. Pat. No. 8,649,160; Latham, U.S. Pat. No. 9,197,039; and Latham U.S. Pat. No. 9,293,897; all of which are incorporated herein by specific reference in their entireties for all purposes.

There is also an issue related to the manufacture of prior art panelboards and power distribution systems. Conducting parts on prior art systems are not designed to perform quality checks between parts when fitted in an effort to facilitate assembly during manufacturing. Prior art system parts require complicated quality control systems and procedures after assembly, and pose a risk of faulty electrical systems being used by installation or maintenance personnel.

Additionally, there is an issue with the architecture of prior art panelboards and power distribution systems as it relates to electrical components (e.g. circuit breaker) compatibility. Prior art panelboards and power distribution systems are designed to accept only one type of component and are not designed to allow all market available products to be installed. Prior art panelboards and power distribution systems are not designed with an "open architecture."

Accordingly, what is needed is a panelboard and power distribution system that overcomes the problems discussed above.

DETAILED DESCRIPTION OF EXEMPLARY EMBODIMENTS

In various exemplary embodiments, the present invention comprises a panelboard and power distribution system adapted to mount and electrically connect to a plurality of electrical components. The panelboard and power distribution system includes a central body portion having a top metal surface and at least one bus bar positioned within the central body portion. The bus bar has "fingers" that extend into retractable insulated louvers. The louvers provide electrical isolation and insulation for personnel by having barriers wrapped around an otherwise exposed "live" bus.

In one embodiment, the panelboard and power distribution system uses a connection louver "system" that allows electrical devices to be connected to the power bus with a louver pivoting at a central point and retracting away from the bus bar. The electrical devices are secured to the system using their own electrical connections (e.g., screws) provided in the body of the electrical device. The louvers and other components of the system are designed to provide universal compatibility with all known electrical devices that are suitable for use.

Figure 1:
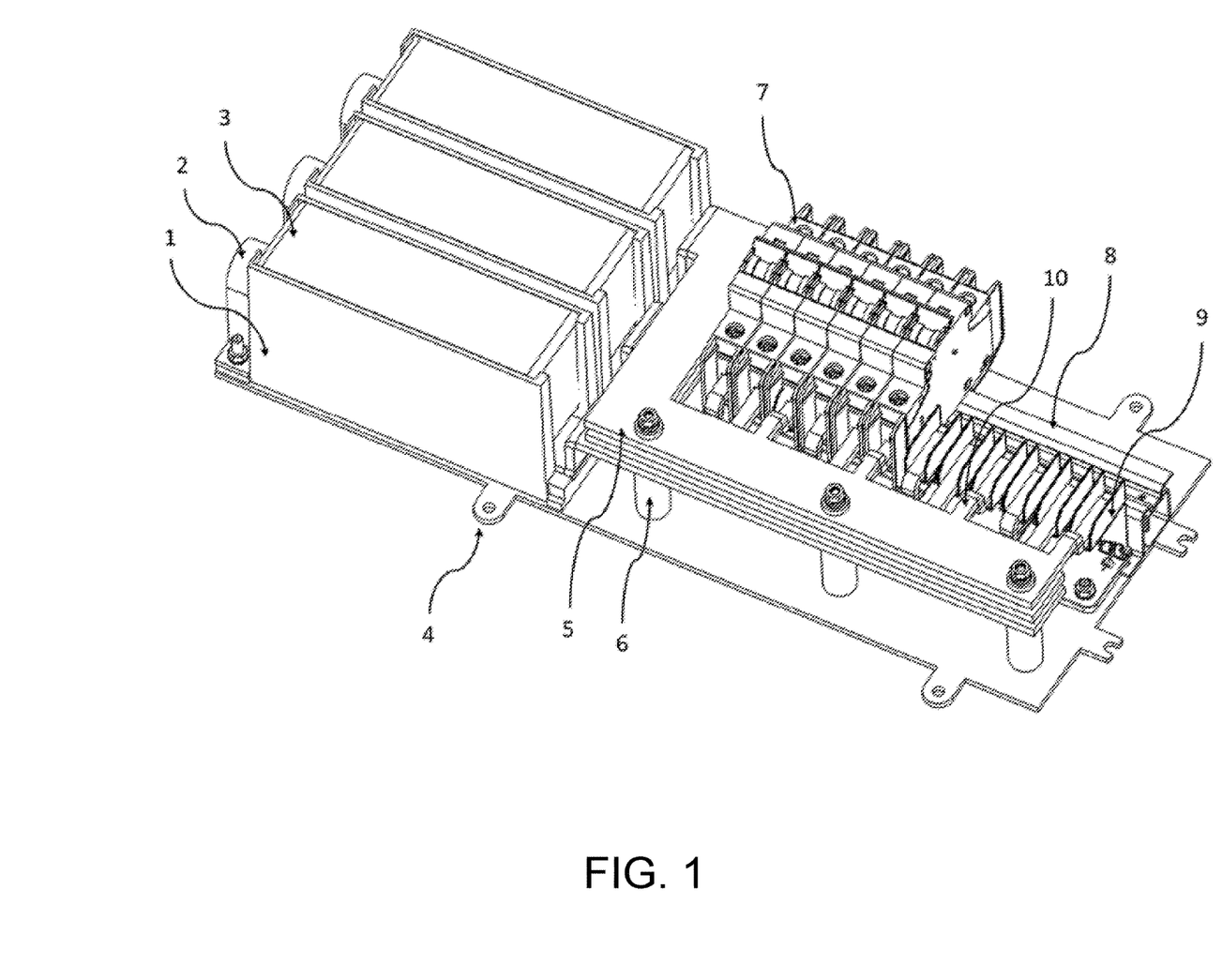
FIG. 1 shows a perspective view of a panelboard in accordance with an exemplary embodiment of the present invention.
Figure 2:
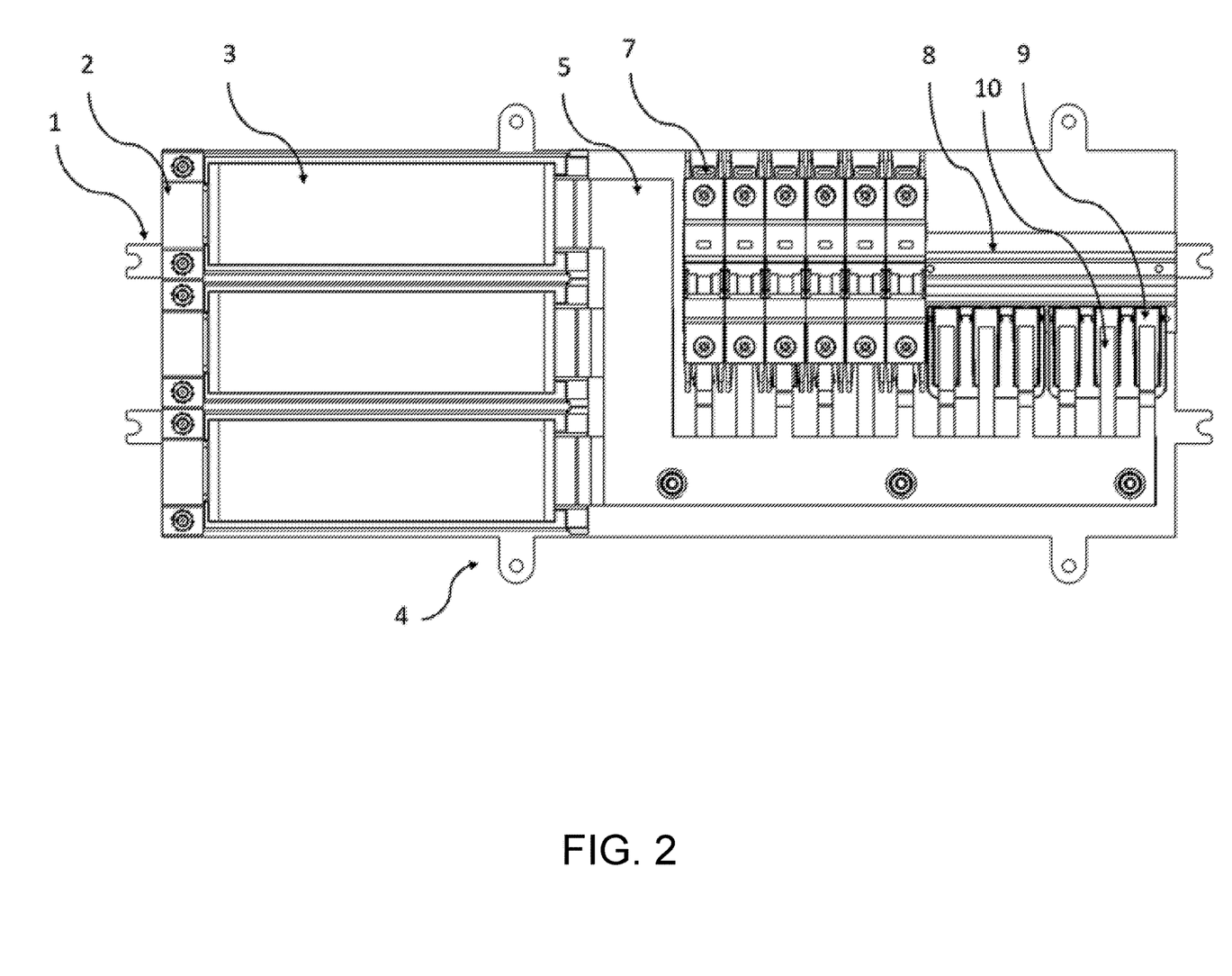
FIG. 2 shows a top view of the panelboard of FIG. 1.
Figure 3:
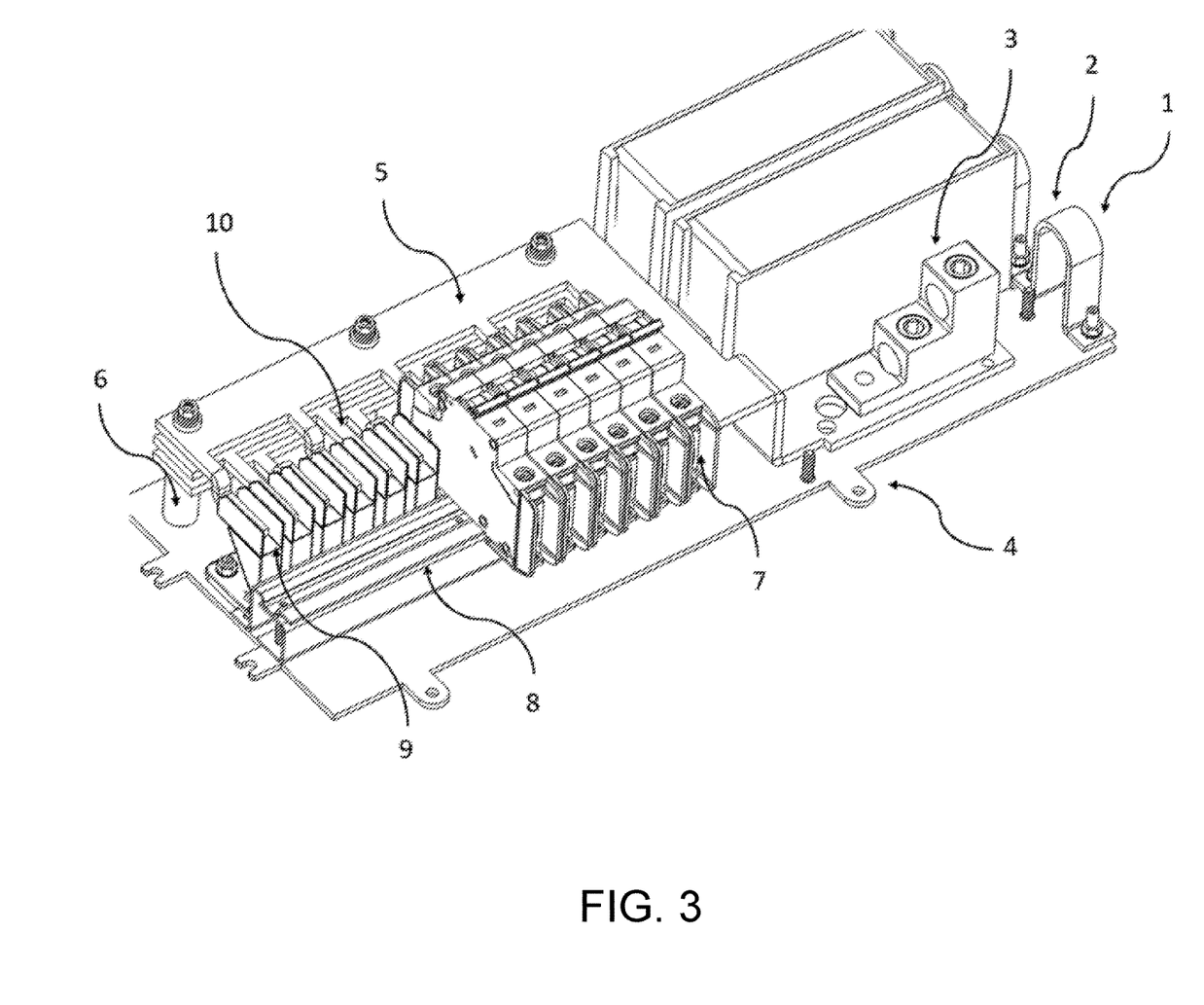
FIG. 3 shows another perspective view of the panelboard of FIG. 1.
Figure 4:
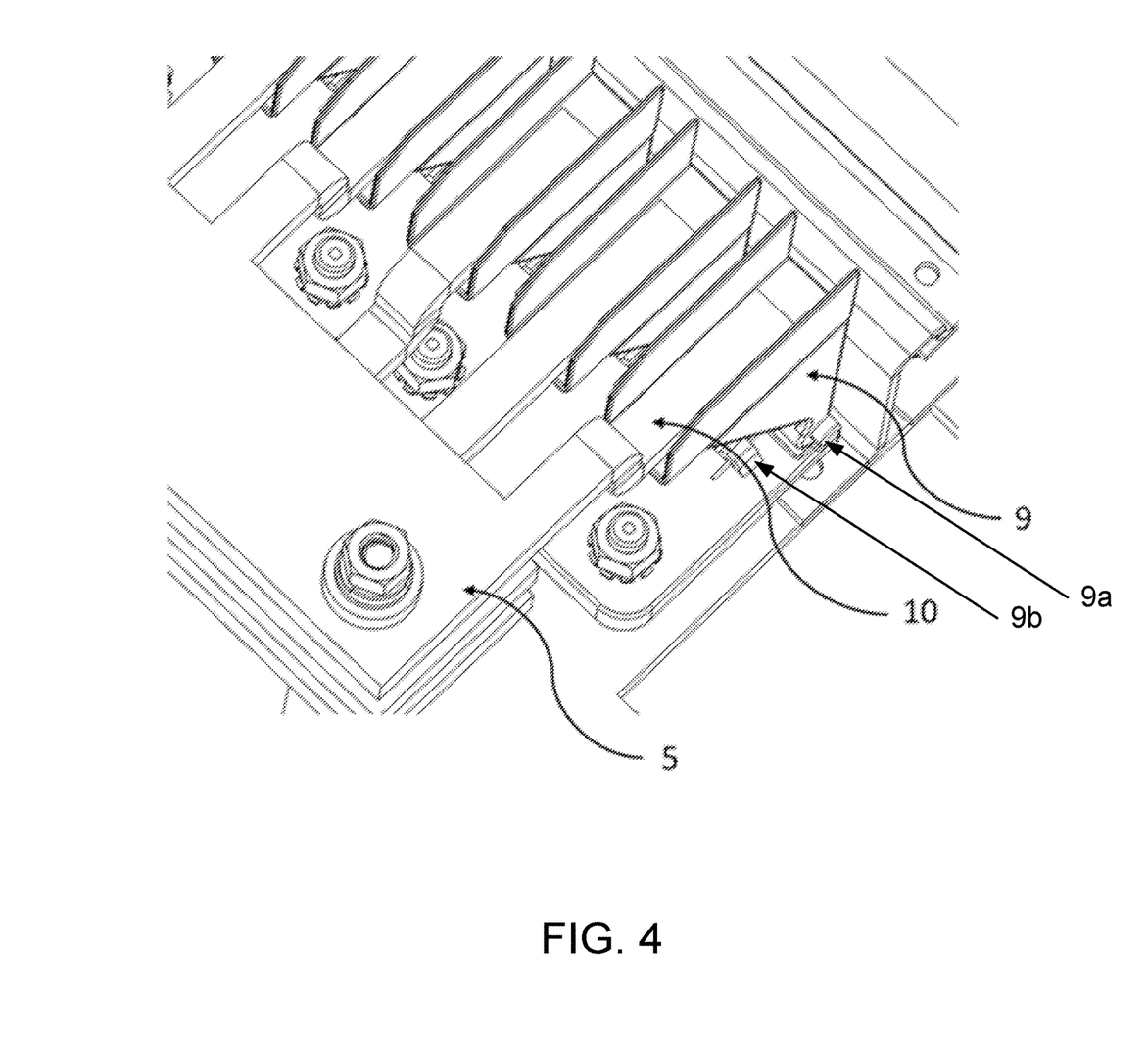
FIG. 4 shows a louver insulator in the default or non-retracted position providing touch-safe protection to the bus bar.
Figure 5:
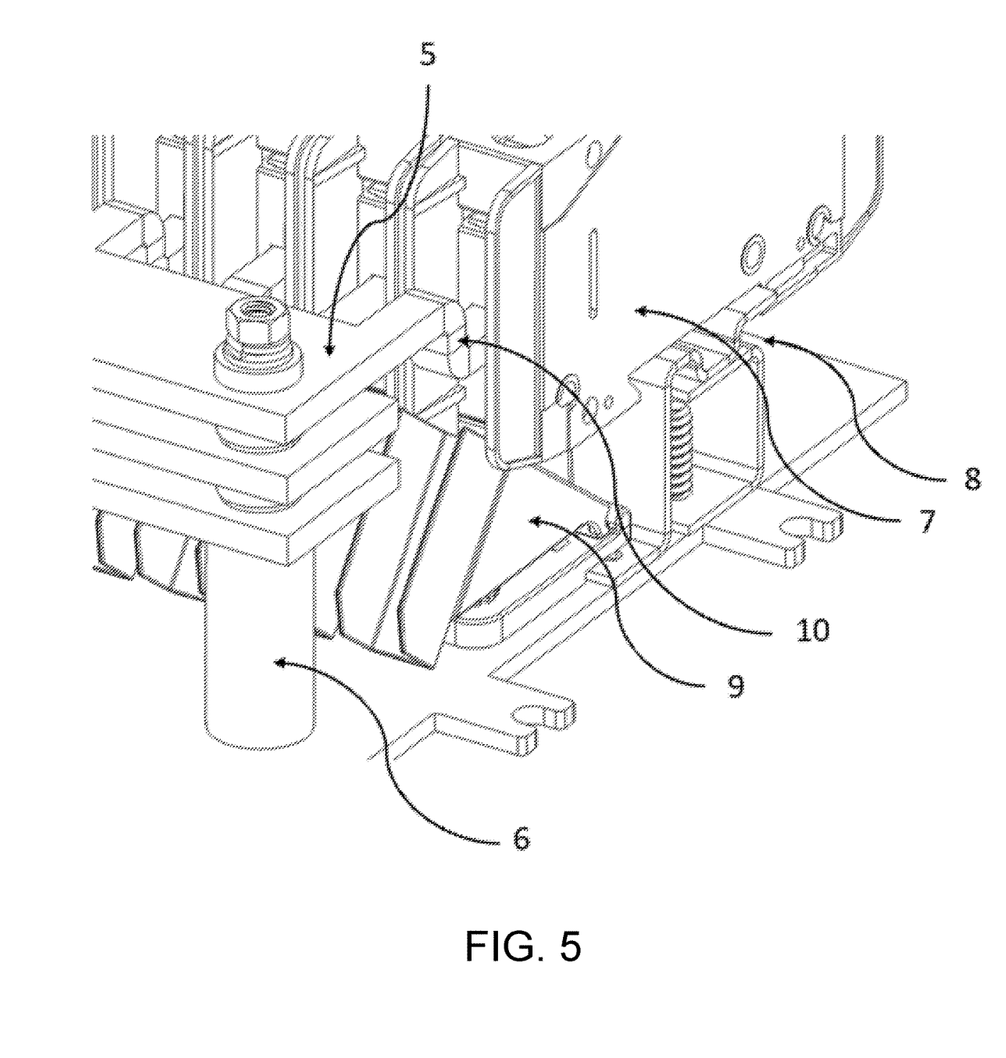
FIG. 5 shows a louver insulator in the retracted position with a device connected to the bus bar.

As seen in FIGS. 1-5, an exemplary embodiment of the present invention comprises a panelboard 1 comprising a plurality of wire clamps 2 and bus bar insulator lug assemblies 3 to allow connection of the incoming power wires. The assembly rests on a metal mounting plate support 4 that provides all components a preset mounting structure. The main distribution bus bar 5 is secured on insulated bracing 6 and distributes incoming power throughout the assembly. Various components 7 may be mechanically secured to the assembly via mounting supports 8. Insulated louvers 9 provide insulated protection of electrical connection points 10 when devices are not installed. The louvers 9 pivot around a pivot point 9a, and are held in a default insulation position (i.e., protecting the electrical connection points) by a spring 9b or similar mechanism. When a component 7 is installed on the system (as seen in FIGS. 4 and 5), the louver at that location pivots downward to a retracted position due to pressure from the component being installed. Components 7 may be secured to the electrical connections points via integral cage terminals or the like. When the component is removed, the spring or similar mechanism pushes the louver back to its default position.

In yet another embodiment, the panelboard and power distribution system comprises an error-proof manufacturing design to provide quality checks during assembly. System components are designed to only fit together in one specific way, with no deviations from manufacturing specifications. The panelboard system design thus removes the necessity to have quality control processes and procedures after assembly, and reduces the risk of providing faulty system to installation and maintenance personnel.

Figure 6:
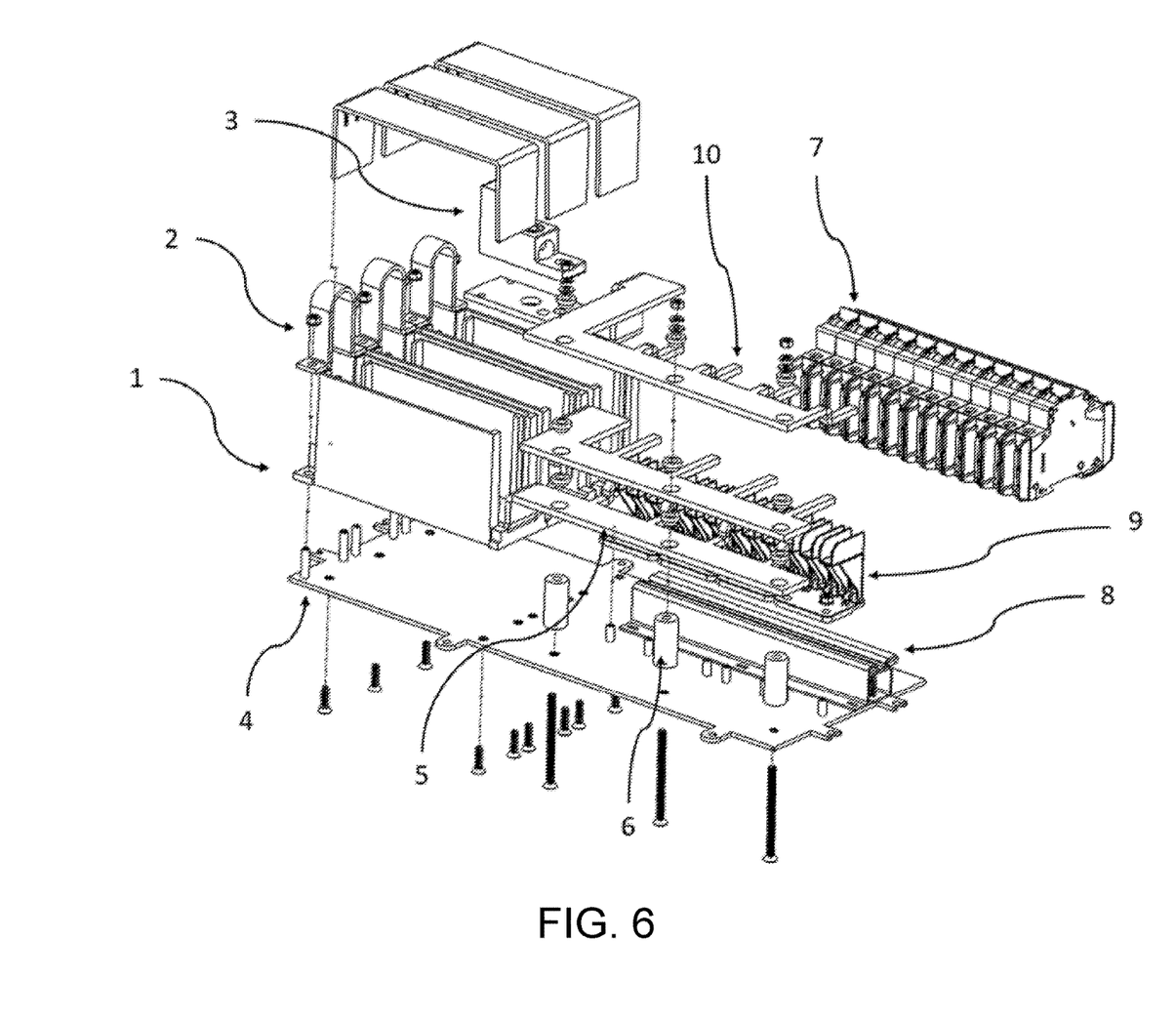
FIG. 6 shows an exploded view of all assembly components.

FIG. 6 shows an exemplary embodiment of the present invention in an exploded view. Due to its error-proof manufacturing design, the panelboard 1 is assembled in the following process:

1. The wire clamp 2 and the incoming insulator lug assembly 3 are fixed to the mounting plate 4. The mounting plate 4 has integral mounting pins and studs that allow the wire clamp 2 and incoming insulator lug assembly 3 be mounted with no allowable deviation from required spacing tolerances.

2. The insulated louvers 9 are fixed to the mounting plate 4. The mounting plate 4 has integral mounting pins and studs that allow the insulated louvers 9 to be mounted with no allowable deviation from required spacing tolerances.

3. The main distribution bus bar 5 is fixed to the mounting plate 4 and the insulated braces 6, and also is fitted into the incoming insulator lug assembly 3, as well as the insulated louvers 9. The configuration of the mounting plate 4, the incoming insulator assembly 3, the insulated braces 6, and the insulated louvers 9 are designed to allow the main distribution bus bar 5 to be assembled in only one way, with no allowable deviation from bus bar stamping and bending tolerances.

4. The interface between the electrical connection points 10 and the insulated louvers 9 provides spacing at intervals along the spine of the main distribution bus bar 5 that require high accuracy in manufacturing for any components to be able to be fitted together.

5. The mounting supports 8 and the electrical connection points 10 are positioned to allow various components 7 to be mounted only in a particular orientation with a particular spacing between devices with no deviation.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The invention claimed is:

1. An improved panelboard system, comprising:
a panelboard with a mounting plate, an incoming insulator lug assembly, a plurality of movable insulators, and at least one bus bar fixedly mounted on said mounting plate;
said at least one bus bar with a plurality of outgoing electrical connections, and mounted on said mounting plate by a plurality of insulated bracing;
wherein said at least one bus bar is connected to the incoming insulator lug assembly; wherein said plurality of movable insulators comprise a plurality of movable insulated louvers mounted on said mounting plate proximate to the at least one bus bar, each of said movable insulating louvers fitted to a corresponding one of said plurality of outgoing electrical connections;
wherein each of said the movable insulating louvers is configured to automatically pivot around a pivot point proximate to the mounting plate from a default position insulating the corresponding one of the plurality of outgoing electrical connections to a second position providing access to said corresponding one of said plurality of outgoing electrical connections when an electrical device is connected to said at least one bus bar through the corresponding one of said plurality of outgoing electrical connections;
wherein each of said movable insulating louvers comprises a triangular base with said pivot point located at an apex thereof, and an channel extending from a side of said triangular base opposite of the pivot point, said channel comprising two side walls and receiving the corresponding one of said plurality of outgoing electrical connections when in the default position;
wherein each of said movable insulating louvers is further configured to automatically pivot from the second position to the default position when the electrical device is removed and
wherein each of said plurality of movable insulators is configured to provide insulation for the corresponding one of said plurality of outgoing electrical connections, each of said plurality of movable insulating louvers is movable with respect to the corresponding one of said plurality of outgoing electrical connections, and each of said plurality of movable insulating louvers is independently mounted to said mounting plate.

2. The panelboard system of claim 1, wherein each of the plurality of movable insulated louvers is held in the second position by the installed electrical device on the corresponding one of said plurality of outgoing electrical connections.

3. The panelboard system of claim 1, wherein each of the plurality of movable insulated louvers is held in the default position by a spring.

4. The panelboard system of claim 1, wherein the mounting plate has a preset mounting structure, configured such that said incoming insulator lug assembly, said plurality of movable insulators, and said at least one bus bar fit together in one specific way with no deviations from manufacturing specifications.

5. The panelboard system of claim 1, wherein the outgoing electrical connections are universal electrical connections.

6. A method of assembling the improved panelboard system of claim 1, comprising the steps of affixing a wire clamp and the incoming insulator lug assembly to the mounting plate, wherein the mounting plate comprises a first set of integral mounting pins and studs that result in the wire clamp and the incoming insulator lug assembly being mounted with no allowable deviation from required spacing tolerances;
affixing the plurality of movable insulated louvers to the mounting plate, wherein the mounting plate comprises a second set of integral mounting pins and studs that result in the plurality of movable insulated louvers being mounted with no allowable deviation from required spacing tolerances; and
affixing the at least one bus bar to the mounting plate, a set of insulated braces, the incoming insulator lug assembly, and the plurality of movable insulated louvers, wherein the configuration of the mounting plate, the incoming insulator assembly, the set of insulated braces, and the plurality of movable insulated louvers are configured to allow the at least one bus bar to be assembled therewith in only one way, with no allowable deviation from bus bar stamping and bending tolerances.

7. The method of claim 6, wherein each of the plurality of movable insulated louvers is pivotable to allow or restrict access to the corresponding one of the outgoing electrical connections, with an interface therebetween.

8. The method of claim 7, wherein the interfaces between the outgoing electrical connections and the movable insulated louvers are configured to provide spacing at intervals along the at least one bus bar, wherein the spacing requires high accuracy in manufacturing of said at least one bus bar with the plurality of outgoing electrical connections, said insulated bracing, and said plurality of movable insulated louvers, to be fitted together.

9. The method of claim 7, wherein the outgoing electrical connections and a corresponding mounting support are positioned to allow the electrical device to be mounted only in a particular orientation with a particular spacing between adjacent ones of the electrical device.

* * * * *